Feb. 22, 1944.　　　O. S. A. MESCH ET AL　　　2,342,594
ELECTROWELDING APPARATUS
Filed Dec. 22, 1942　　　2 Sheets-Sheet 1

INVENTORS: O.S.A.MESCH
W.T.PRITCHARD
BY J. MacDonald
ATTORNEY

Feb. 22, 1944.   O. S. A. MESCH ET AL   2,342,594
ELECTROWELDING APPARATUS
Filed Dec. 22, 1942   2 Sheets-Sheet 2
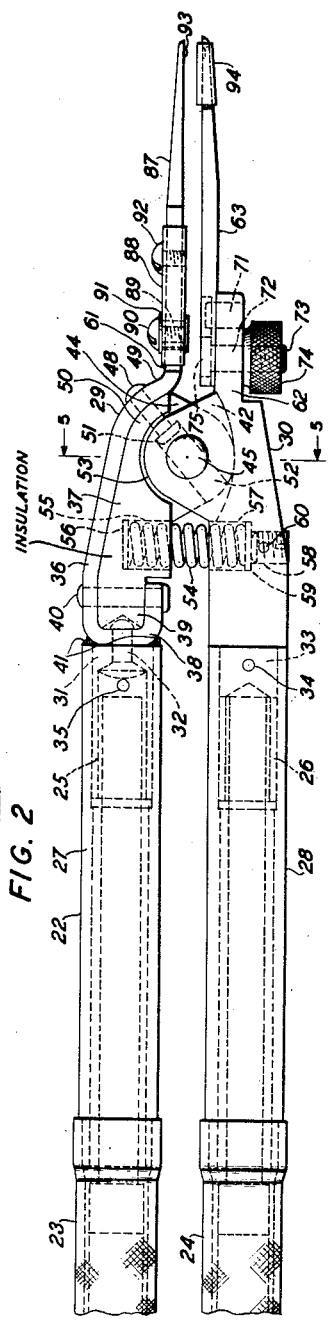
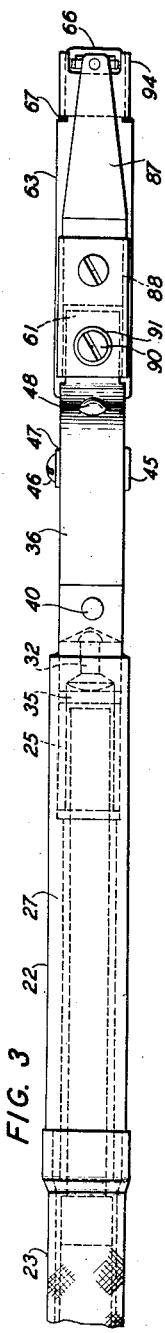
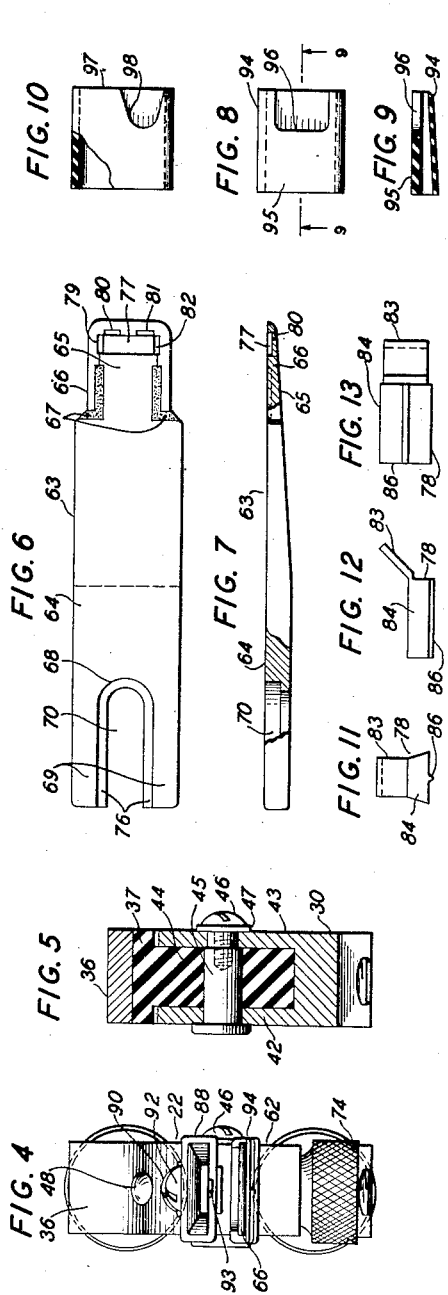
INVENTORS: O. S. A. MESCH
W. T. PRITCHARD
BY J. MacDonald
ATTORNEY Patented Feb. 22, 1944

2,342,594

UNITED STATES PATENT OFFICE 2,342,594

ELECTROWELDING APPARATUS

Orwar S. A. Mesch, St. Albans, N. Y., and William T. Pritchard, Belvidere, N. J., assignors to Bell Telephone Laboratories, Incorporated, New York, N. Y., a corporation of New York Application December 22, 1942, Serial No. 469,781

3 Claims. (Cl. 219—4)

This invention relates to electrowelding apparatus and more particularly to electrowelding apparatus involving a hand tool for holding parts in engagement to be welded and applying welding current to the parts.

The apparatus provides means for quickly and accurately welding a small piece of contact metal to a support.

The invention is embodied in a pliers type welding tool constructed and arranged to hold a small piece of contact metal in required position for welding to a support.

A feature of the invention resides in the structure of an electrode in the pliers type tool.

Another feature resides in an insulating guard supported on one of the electrodes.

In the drawings:

Fig. 1 shows the pliers type welding tool manually held in position relative to some closely spaced leaf spring type supports and in required position for welding a small piece of contact metal to one of the leaf spring type supports. A push button type switch shown as being also manually held is provided to close a welding circuit. The switch and the pliers type tool are electrically connected to welding current supply means housed in a carrying case which rests on a ladder or other means of support;

Fig. 2 is a side elevational view of the pliers type tool;

Fig. 3 is a top view of the tool shown in Fig. 2;

Fig. 4 is an end view of the tool shown in Fig. 2 and taken from the right of Fig. 2;

Fig. 5 is a view, in section, taken on the line 5—5 in Fig. 2;

Fig. 6 is an enlarged top view of the lower electrode of the tool shown in Fig. 2;

Fig. 7 is an edge view, partly in section of the electrode shown in Fig. 6;

Fig. 8 is a top plan view of the insulating guard;

Fig. 9 is a view in section of the guard shown in Fig. 8 taken on the line 9—9;

Fig. 10 is a top view, partly in section, of a modification of the insulating guard; and Figs. 11, 12 and 13 are enlarged end, side and top views respectively of the piece of contact metal.

Figure 1:
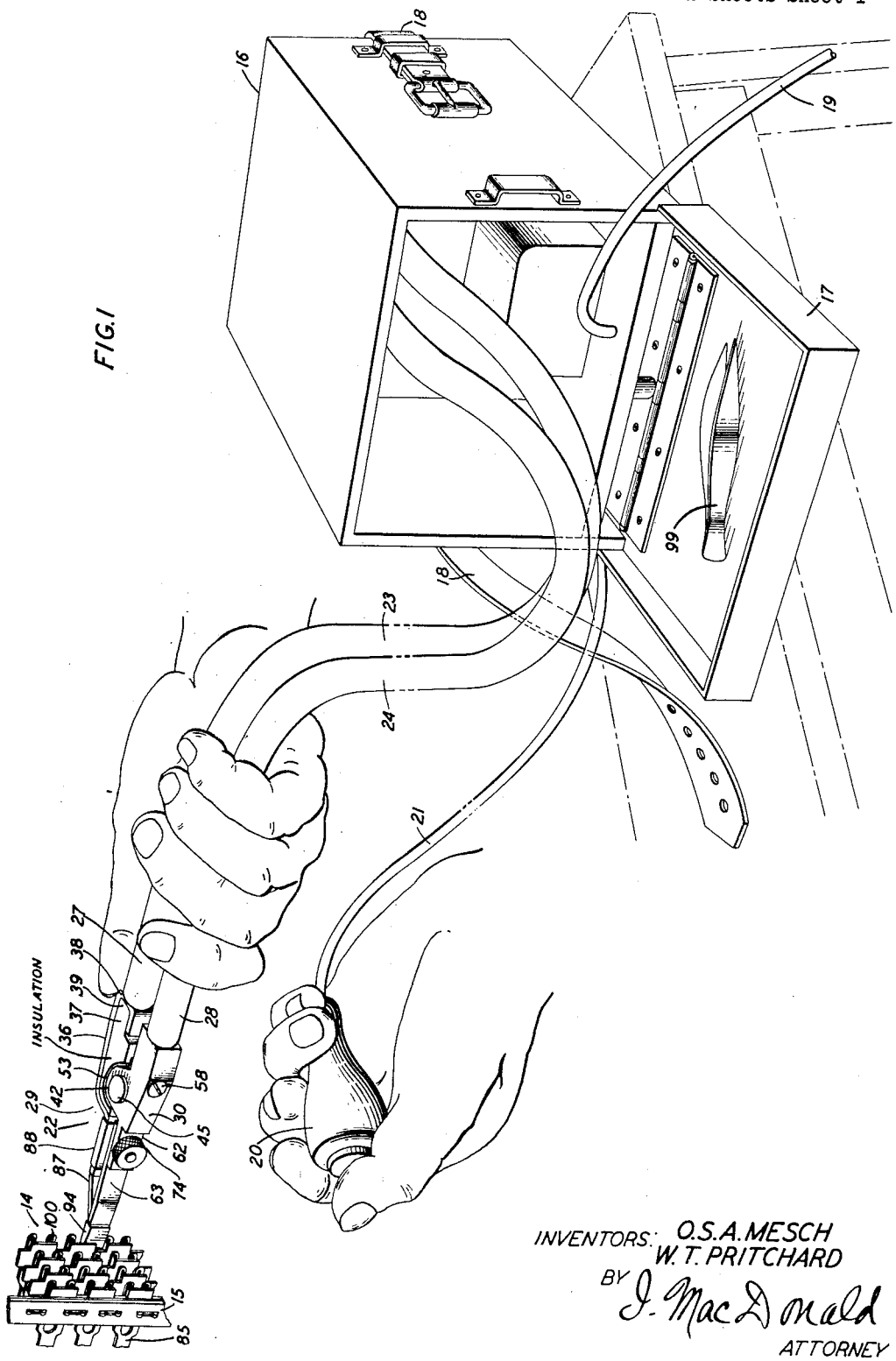

It is common practice to have in electrical switching devices a pile-up of conducting supports (insulated from each other) and to have on the conducting supports small pieces of contact metal through which the current may pass from one conducting support to another when the contacts are operated to a circuit closing position. The pieces of contact metal become worn and ineffective in service and require reconditioning or replacing. The conducting supports in many cases are leaf spring type members arranged in the form of a pile-up and the leaf spring members in the pile-up are quite near each other. Considerable difficulty has been experienced in trying to replace a worn or ineffective contact with a new piece of contact metal due to the rather close spacing of the conducting supports in the pile-up and the limited amount of space available for applying a tool in fastening the new piece of contact metal in place. Because of these difficulties it is common practice to remove the entire switching device from its support, remove and separate the leaf springs in the pile-up and replace the leaf springs having the worn or ineffective contacts with new leaf springs equipped with new contacts. This is quite expensive because considerable labor is involved in dismantling the parts and reassembling the switching device and because it involves scrapping the whole leaf spring and replacing it with a new one. It also involves removal of the unit from service for a considerable time which is objectionable. The expense of maintaining a stock of all spring combinations for replacement purposes is almost prohibitive.

Our invention provides means for electrowelding a new piece of contact metal to a leaf spring type support in a pile-up of leaf springs without removing the switching device from its support and without requiring disassembling and reassembling the pile-up of leaf springs. It is obvious, therefore, that the invention provides a means for considerably reducing the cost of reconditioning the contact parts of electrical switching devices.

The welding apparatus as shown in Fig. 1 is made portable so that it may be taken to the vicinity of a group of leaf spring type supports 14 which it will be understood may be pile-ups of leaf spring type supports in an electrical switching device supported on a frame 15. Certain parts of the welding apparatus are housed in a carrying case 16 equipped with a hinge-connected lid 17 and a carrying strap 18. A source of current supply, not shown, is electrically connected to certain parts contained in the carrying case 16 by means of an extension cord 19. A manually controlled push button switch 20 electrically connected to apparatus in the carrying case 16 by means of an extension cord 21 is provided to control the application of welding current to electrodes in the pliers type welding tool 22. The welding tool 22 is supplied with welding current through the flexible insulated conductors 23 and 24 which extend from certain apparatus parts housed in the carrying case 16 and to handles of the welding tool 22.

The pliers type welding tool 22 shown in Figs. 1, 2 and 3 operates in a squeeze-to-open manner and comprises handles 25 and 26 of conducting material covered with insulating sleeves 27 and 28 respectively. The handles 25 and 26 are tubes of conducting material electrically connected to jaws 29 and 30, respectively, of conducting material, the handle 25 being closed at one end 31 and secured by means of a rivet 32 to the jaw 29 and the handle 26 being assembled over a reduced inner end portion 33 of the jaw 30 and secured thereto by means of a cross pin 34 extending transversely through the handle 26 and the reduced end portion 33 of the jaw 30. A cross-pin 35 extending transversely through the handle 25 and against the inner end of the rivet 32 helps to prevent loosening of the rivet 32.

The jaw 29 is made in two parts and comprises a conducting part 36 and a block 37 of insulating material. The part 36 may be made of relatively thick band metal and is bent back in return bend form at its inner end to provide a U-shaped portion 38 which extends around a reduced inner end portion 39 of the block 37. A rivet 40 extends through the portion 38 of the conducting part 36 and through the reduced end portion 39 of the block 37 to hold the parts together. The closed end of the U-shaped portion 38 is secured by means of the rivet 32 to the closed end 31 of the handle 25. To insure good electrical connection of the conducting part 36 and the handle 25, the U-shaped portion 38 of the conducting part 36 is solder-connected at 41 to the closed end 31 of the handle 25. The jaw 30 of conducting material is provided with spaced ears 42 and 43 which extend upwardly about a single ear 44 provided on the block 37. The ears 42, 43 and 44 are apertured to receive a bolt 45 which extends through the apertures in the ears 42, 43 and 44 to pivotally connect the jaws 29 and 30, the bolt 45 being equipped with a screw 46 and a washer 47 to retain the bolt in position. The ear 44 is diametrically drilled and the drill hole is continued through a forward portion of the block 37 and through an overlying portion of the conducting part 36 to receive a rivet 48 which serves to secure a downwardly sloping portion 49 of the conducting part 36 to the nose portion 50 of the block 37, the head of the rivet 48 being located outside the conducting part 36 and the inner end of the rivet 48 being spun over as shown at 51 in an enlarged portion of the drill hole 52. The block 37 is arcuately recessed on both sides directly above the ear 44 as shown at 53 to accommodate the upper ends of the ears 42 and 43 and it will be seen that when the handles 25 and 26 are squeezed toward each other the outer ends of the jaws 29 and 30 will be opened to the position shown in Fig. 2, the jaws 29 and 30 pivoting on the bolt 45. A helical spring 54 is provided to urge the outer ends of the jaws 29 and 30 toward a closed position, one end of the spring 54 being located in a recess 55 in the block 37 and engaging a washer 56 located in the upper end of the recess 55 and the other end of the spring 54 being located in a shouldered aperture 57 formed in the jaw 30. The normal pressure of the spring 54 may be adjusted by means of a screw 58 to obtain the proper pressure between the electrodes, the screw 58 being located in a tapped extension of the aperture 57, the upper end of the screw 58 bearing against a washer 59 located between the upper end of the screw 58 and the lower end of the spring 54. A removable drive pin 60 set in an aperture in the jaw 30 and extending into engagement with the screw 58 is provided to hold the screw 58 in adjusted position. Since the insulating block 37 insulates the conducting part of jaw 29 from the conducting jaw 30 and one end of the spring 54 is located in the insulating block 37 there is no electrical connection between the jaws 29 and 30 at their pivotal point of connection and through the spring 54.

The forward end 61 of the jaw 29 and the forward end 62 of the jaw 30 extend in parallel spaced relation when the handles 25 and 26 are in the position shown in Fig. 2. Each jaw supports a relatively long electrode constructed and arranged so that the electrodes may be thrust along a leaf spring type support to receive the leaf spring type support between them. The electrode 63 is removably mounted on the forward end 62 of the jaw 30 as shown in Fig. 2 and comprises as shown in Figs. 6 and 7 a rectangular body 64 reduced in width and thickness at its forward end portion as shown at 65. A plate 66 of high melting point metal is secured to the end portion 65 and extends beyond the end portion 65. The plate 66 is made of good electrical conducting material and is so connected to the end portion 65 that current may readily pass from the body 64 to the plate 66. A simple and satisfactory manner of connecting the parts is to form a recess in the plate 66 to accommodate the end portion 65 and solder-connect the parts by means of silver solder as shown at 67 in Fig. 6. The electrode 63 is bifurcated at 68 having leg members 69—69 defining an elongated opening 70 to accommodate a pin 71 and the shank portion 72 of a bolt 73, the pin 71 being fixedly mounted in the forward end 62 of the jaw 30 and the bolt 73 being located rearwardly of the pin 71. The bolt 73 is equipped with a thumb nut 74 and the head 75 of the bolt 73 bears against shoulders 76—76 formed in the leg members 69—69 along the elongated opening 70. The bolt 73 serves to clamp the electrode 63 to the forward end 62 of the jaw 30 and the pin 71 prevents pivoting of the electrode 63 on the bolt 73.

A rectangular recess 77 is formed in the upper face of the plate 66 as shown in Figs. 6 and 7 to provide a receptacle for the piece of contact metal 78 shown in Figs. 11, 12 and 13 and apertures 79, 80, 81 and 82 are formed in the plate 66 adjacent the upper and lower right corners of the recess 77 to receive a tab 83 extending angularly from the body 84 of the piece of contact metal 78.

The welding tool 22 provides a means for welding the piece of contact metal 78 to a leaf spring type support 85 which as shown in Fig. 1 may be any one of a group of leaf spring type supports 14 arranged in pile-ups and supported on a frame 15. The piece of contact metal 78 has a longitudinal ridge 86 on one face to be placed against the left spring type support when the piece of contact metal is being welded to the leaf spring type support.

When the piece of contact metal 78 is to be welded to a leaf spring type support 85 the tab 83 is thrust into one of the apertures 79, 80, 81 or 82 in the plate 66, the aperture selected being in accordance with the position it is desired to have the piece of contact metal 78 take on the leaf spring type support. It will be seen by looking at Figs. 6, 7 and 12 that when the piece of contact metal 78 is placed in the recess 77 and so that the tab 83 extends into one of the apertures 79, 80, 81 and 82 the ridge 86 will be facing upward and may be brought into contact with a leaf spring type support. The tab 83 normally extends at about a 45 degree angle from the plane of the body 84 and when thrust into one of the apertures in the plate 66 will have sufficient friction against the walls defining the aperture to hold the piece of contact metal 78 in a required position on the plate 66. If the tab 83 is placed in the aperture 79 or 82 the body 84 of the piece of contact metal 78 will extend lengthwise of the recess 77. The piece of contact metal 78 may be located crosswise of the recess 77 by placing the tab 83 in either the aperture 80 or the aperture 81. The piece of contact metal 78 may therefore be selectively positioned on the plate 66 and consequently selectively positioned on the leaf spring type support 85.

An electrode 87 is supported on the forward end 61 of the jaw 29 by means of a substantially flat tubular member 88, one end of which is thrust over the forward end 61 of the jaw 29 and secured thereto by means of a bushing 89 extending through apertures in the tubular member 88 and through an aperture in the forward end 61 of the jaw 29, the bushing 89 being equipped with a holding screw 90 having a lockwasher 91. The outer end of the tubular member 88 is telescoped over the inner end of the electrode 87 and is secured thereto by means of a machine screw 92 extending through an aperture in the tubular member 88 and into a tapped hole in the inner end of the electrode 87. The tubular member 88 is slidably fitted on the forward end portion 61 of the jaw 29 and is journaled on the bushing 89 so that the electrode 87 may be swung laterally of the forward end portion 61 to bring a contact point 93 on the outer end of the electrode 87 into registry with a desired point on the piece of contact metal 78 supported on the plate 66. The screw 90 may be tightened in the bushing 89 to a sufficient extent to press the upper and lower walls of the tubular member 88 against the forward end 61 of the jaw 29 to hold the electrode 87 in adjusted position.

A tubular guard 94 of insulating material is telescoped over the plate 66 to prevent too far thrusting of the electrodes 63 and 87 along a leaf spring type support 85 and to position the leaf spring with respect to contact 78 on electrode 63 when the tool 22 is being moved to bring a piece of contact metal 78 to a required position on the leaf spring type support 85. The guard 94 also prevents the contact point 93 on the electrode 87 from coming into engagement with the plate 66 when the handles of the tool 22 are manually released. The guard 94 as shown in Figs. 8 and 9 is substantially a flat tube of insulating material shaped to fit snugly over the plate 66 and having walls somewhat thicker than the depth of the contact point 93. The top wall 95 of the guard 94 is cut away on its forward end to provide an opening 96 contoured to receive an end portion of the leaf spring type support 85. The form of guard 94 shown in Fig. 8 may be used when the forward end of the leaf spring type support 85 is substantially wide. The shape of the aperture 96 in the guard 94 will depend on the shape of the free end of the leaf spring type support against which the tool 22 is being applied. In Fig. 10 is shown a guard 97 which may be used in place of the guard 94 when a relatively narrow and tapered leaf spring type support is to be accommodated by the tool 22. In this case the upper wall of the guard is apertured at 98 to take the contour of the end of the narrow tapered leaf spring type support. It is obvious that guards having apertures of other forms than those shown in Figs. 8 and 10 may be provided to be used on the tool 22.

To weld the piece of contact metal 78 to the leaf spring type support 85, the guard 94 is thrust over the plate 66 on the electrode 63, the handles of the tool 22 being manually squeezed toward each other to hold the jaws of the tool in an open position. The piece of contact metal 78 is placed in the required position in the recess 77 and so that the tab 83 extends into one of the apertures 79, 80, 81 and 82 and the ridge 86 extends upwardly of the upper surface of the plate 66. The aperture selected to receive the tab 83 will depend on whether the contact to be formed by the piece of contact metal 78 is to be located in an upper or lower corner of the outer end of the leaf spring type support and the direction in which the contact should extend on the surface of the leaf spring type support. For instance, when the contact should be in the upper right corner of the leaf spring type support and should extend longitudinally of the leaf spring type support the tab 83 would be inserted in the aperture 80. The electrode 87 is then adjusted so that the contact point 93 is in registry with the piece of contact metal 78. With the electrodes 63 and 87 spaced apart as shown in Fig. 2 the tool 22 is applied to the leaf spring type support 85 as shown in Fig. 1 and so that the outer end of the leaf spring type support, upon which the contact is to be welded, extends into the space between the outer ends of the electrodes of the tool. Manual pressure on the handles of the tool is then slightly lessened to permit the contact point 93 to engage one face of the leaf spring type support 85, the opposite face being engaged by the piece of contact metal 78. The tool 22 is then manually moved relative to the leaf spring type support 85 until the outer end of the support 85 rests in the aperture 96 in the guard 94 and further inward thrusting and up or down movements of the electrode portions of the tool 22 are prevented by the guard 94. The manual pressure on the handles of the tool 22 is then completely released to permit the predetermined spring pressure of spring 54 to exert its full pressure on the jaws 29 and 30. When the tool 22 has been manually brought to the required position relative to the leaf spring type support 85 and the piece of contact metal 78 is bearing against one face of the leaf spring type support 85, the other face being engaged by the contact point 93 and the piece of contact metal 78 is at the required point for welding to the leaf spring type support 85, the push button type switch 20 is manually operated to switch on the welding current. With the welding current applied to the ridge 86 on the piece of contact metal 78 the same melts, and the pressure of the spring 54 forces the piece of contact metal 78 into more firm engagement with the face of the leaf spring type support 85. It will be understood that the strength and duration of the welding current may be manually or automatically controlled by means of suitable devices provided in the welding apparatus and that the welding current will be sufficient to cause the piece of contact metal 78 to be welded to the leaf spring type support 85.

After welding of the parts has been accomplished the handles of the tool 22 are manually squeezed toward each other until the plate 66 is moved a sufficient distance from the piece of contact metal 78 to release the plate 66 from engagement with the tab 83. Under this condition the tool 22 may be manually withdrawn from the leaf spring type support 85 and the piece of contact metal 78 welded to the leaf spring type support 85. The tab 83 is later removed from the piece of contact metal by means of a pair of hand tweezers 99, the operator grasping the tab 83 with the tweezers 99 and rocking the tab 83 back and forth until the tab 83 breaks away from the body 84 of the piece of contact metal. This leaves the body 84 of the piece of contact metal 78 to serve as a contact point 100 on the leaf spring type support 85.

It will be seen by looking at Fig. 1 that the pliers type welding tool 22 may be used in welding pieces of contact metal to a plurality of relatively closely spaced leaf spring type supports 85 supported on a frame 15 and that by reason of the construction of the tool 22 it is unnecessary to remove the leaf spring type supports 85 from the frame 15 to permit performance of the welding operation.

What is claimed is:

1. A pliers type welding tool suitable for welding a tab-equipped piece of metal to a leaf spring type support comprising a pair of pivotally connected jaws, means to operate said jaws, an electrode supported on each of said jaws, said electrodes being arranged to receive said leaf spring type support between them, a plate supported on one of said electrodes and said plate having formed therein a recess to receive said piece of metal and a plurality of spaced apertures to receive and hold the tab on said piece of metal so that said piece of metal may be releasably held in a selected position for welding to said leaf spring type support.

2. A pliers type welding tool suitable for welding a tab-equipped piece of metal to a leaf spring type support comprising a pair of pivotally connected jaws, means to operate said jaws, a finger type electrode supported on one of said jaws, a bar type electrode supported on the other of said jaws, said electrodes being arranged to receive said leaf spring type support between them, a plate supported on said bar type electrode and formed to releasably hold said piece of metal in a required position for welding to said leaf spring type support, a tubular guard of insulating material telescoped over said plate and having formed therein an aperture to receive an end of said leaf spring type support and said guard operating to engage said leaf spring type support and prevent too far thrusting of said electrodes along said leaf spring type support.

3. A pliers type welding tool suitable for welding a tab-equipped piece of metal to a leaf spring type support comprising a pair of relatively movable jaws pivotally connected and insulated from each other, means to operate said jaws toward a closed condition, a finger type electrode pivotally mounted on one of said jaws and operable for movement laterally of said jaws, means to hold said electrode in a required position, a bar type electrode supported on the other of said jaws, said electrodes being arranged to be thrust longitudinally along said leaf spring type support so that said leaf spring type support will be in parallel relation with and between said electrodes, a plate supported on an outer end of said bar type electrode, said plate having formed therein a recess to receive said piece of metal and a plurality of apertures to selectively receive the tab on said piece of metal, a tubular guard of insulating material supported on said plate and enclosing said plate, said guard having an aperture formed therein of such contour that it will receive an end portion of said leaf spring type support and said guard operating to limit the extent to which said electrodes may be thrust along said leaf spring type support when said piece of metal is brought by means of said electrodes into a clamped condition against said leaf spring type support.

ORWAR S. A. MESCH.
WILLIAM T. PRITCHARD.